United States Patent [19]

Rusteberg

[11] Patent Number: 4,548,232

[45] Date of Patent: Oct. 22, 1985

[54] VALVE ASSEMBLY

[75] Inventor: Robert K. Rusteberg, Barrington Hills, Ill.

[73] Assignee: Panlmatic Company, Elk Grove Village, Ill.

[21] Appl. No.: 599,494

[22] Filed: Apr. 12, 1984

[51] Int. Cl.⁴ .......................................... F16K 31/20
[52] U.S. Cl. ................................. 137/519; 137/202; 261/64 D
[58] Field of Search ............... 137/202, 217, 430, 519, 137/625.33; 261/64 D, 77

[56] References Cited

U.S. PATENT DOCUMENTS

| 953,079 | 3/1910 | Whiting | 137/202 |
| 1,213,033 | 1/1917 | Souers | 137/202 |
| 2,623,217 | 12/1952 | Ward | 137/202 X |
| 2,944,567 | 7/1960 | Jaskarzec | 137/625.33 X |
| 4,168,705 | 9/1979 | Raab | 137/202 X |

FOREIGN PATENT DOCUMENTS

| 442776 | 5/1975 | U.S.S.R. | 261/64 D |
| 489912 | 2/1976 | U.S.S.R. | 137/202 |

Primary Examiner—Robert G. Nilson
Attorney, Agent, or Firm—Robert E. Wagner; Ralph R. Rath

[57] ABSTRACT

A check valve includes an elongated housing having an inlet port at the upper end and an outlet port at a lower end and a float movable therein. An exterior valve seat surrounds the outlet and a valve stem connected to the float extends through the outlet port and has a valve element on the outer end which cooperates with the valve seat.

6 Claims, 4 Drawing Figures

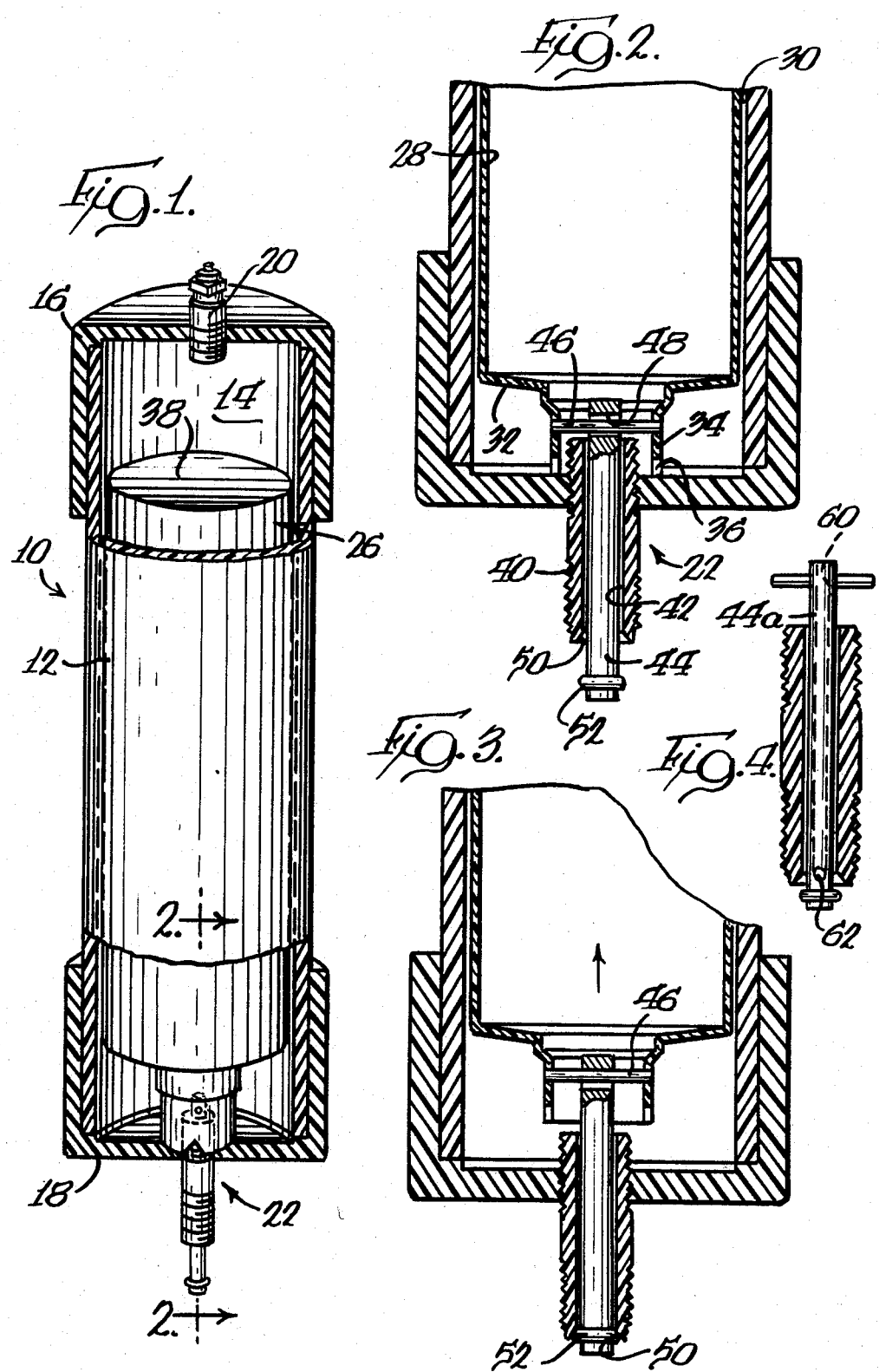

VALVE ASSEMBLY

TECHNICAL FIELD

The present invention relates to apparatus for controlling the flow of fluids and, more particularly, to a check valve for controlling the flow of gas through a conduit into a liquid while preventing backflow of the liquid through the conduit.

BACKGROUND PRIOR ART

When injecting a gas into liquid, it is generally desirable to control the flow of the gas so that the flow is in one direction. Various check valves have been proposed for such purpose.

For example, the use of ozone for water treatment, such as in swimming pools or hot tubs, has become extremely popular. In introducing the ozone into the pool of liquid, it is most common to utilize an ozone generator and a pump to draw air through the generator and produce ozone, which is then pumped directly into the liquid pool or into the return line or recirculating system for the pool of liquid. In such a system, it is desirable to prevent any liquid from flowing back through the gas line and into the ozone generator.

In the past, various types of check valve systems have been proposed for preventing the flow of liquid while accommodating the flow of gases in various types of systems, and the most common type of check valve that is in existence in what is commonly referred to as a spring-biased check valve, in which a valve element is biased to a closed position and is opened by the pressure of the gas or liquid. However, a system as described above cannot utilize a spring-biased check valve since the ozone will rapidly oxidize the parts. Furthermore, since the ozone-generating system operates at extremely low pressures, spring-biased check valves are not suitable for such use. In addition, it has been found that through the passage of time the flow of the ozone through any type of check valve will oxidize the port or valve seat to such an extent as to cause leakage.

Furthermore, most, if not all, commercially-available check valves cannot effectively operate at very low gas flow without leakage. Continuous use of check valves at very low flows will create what is known as a "burning" effect. Thus, as the valve element moves toward the associated valve seat, the relative movement between the element and seat may result in a small path of least resistance between the seat and the element. This small restricted path will result in increases in the velocity of flow, which will have destructive effects on the surface of the valve seat or valve element and will ultimately produce a leak in that area.

In the past, floation plugs have been utilized to effectively seal off the flow of gas upon the application of the back pressure. This floatation plug generally consists of a floating member supported within a housing that is normally in a position spaced from the gas port inlet while gas is flowing through the valve or plug and moves towards the inlet port and seals off the port when liquid is received from the liquid port or into the liquid port. While such types of floating check valves have been proposed, none seem to be fully effective in the above environment. Positive-type of valving is required to protect against backflow.

SUMMARY OF THE INVENTION

According to the present invention, a flow and floating check valve has been developed which can positively interrupt the flow of a liquid through the valve while accommodating the flow of gas towards the liquid source. The check valve of the present invention includes a generally elongated housing that is closed at opposite ends and has a gas inlet at one end and a gas outlet and/or liquid inlet at the opposite end. The elongated housing contains an open-ended float or cylinder having a length and diameter less than the length and diameter of the elongated housing. The space between the float and housing forms an annular air-flow passage. The cylinder is preferably closed adjacent the gas inlet and is in open communication with the housing adjacent the gas outlet-liquid inlet. A valve stem is connected to the open lower end of the float and extends through the gas outlet with a movable valve seating element on the outer end of the valve stem which cooperates with a fixed valve seat that is formed in the gas outlet.

During normal gas flow, the float is inactive; however, when no gas is flowing, should liquid backflow into the line, the buoyant force of the liquid entering the open end of the float forces the valve stem upward to seal the port. Any increase in liquid pressure increases the sealing force which will be effective in sealing off the port even if there are slight imperfections in the seating surfaces.

In one preferred embodiment, the gas outlet is formed by a nipple or short sleeve which is threaded into an opening in the end cap of the housing. The lower end of the sleeve contains a circular, fixed valve seat. A valve stem has a slightly smaller external diameter than the outside diameter of the sleeve with the clearance providing an annular passage for gas and liquid flow. The movable valve stem has an enlarged end which supports an O-ring cooperating with the fixed valve seat. The upper end of the valve stem is loosely connected to the float to permit relative movement accommodating any misalignment of the float within the housing preventing sticking and assuring its reliable operation.

BRIEF DESCRIPTION OF SEVERAL VIEWS OF DRAWINGS

FIG. 1 is a fragmentary cross-sectional perspective view of the flow and floating check valve of the present invention;

FIG. 2 is an enlarged fragmentary sectional cross-sectional view, as viewed along line 2—2 of FIG. 1;

FIG. 3 is a view similar to FIG. 2, showing the flow and floating check valve in its closed position; and, FIG. 4 is an enlarged fragmentary cross-sectional view showing a slightly modified form of valve arrangement.

DETAILED DESCRIPTION

While this invention is susceptible of embodiment in many different forms, the drawings illustrate and the specification describes in detail a preferred embodiment of the invention with the understanding that the present disclosure is to be considered as an exemplification of the principles of the invention and is not intended to limit the broad aspect of the invention to the embodiment illustrated and described.

The flow and floating check valve of the present invention is illustrated in FIG. 1 and is generally designated by reference numeral 10. The check valve consists of a cylindrical housing 12 that defines an inner or main chamber 14. First and second caps 16 and 18 respectively close the opposite ends of the cylindrical chamber 14 and have ports 20 and 22. An open-ended float 26, resembling an inverted bottle, is located within chamber 14 and includes a generally cylindrical member 28 that has an outside diameter slightly smaller than the inside diameter of the main chamber to define an annular space 30 permitting fluid flow, such as a gas from an ozone generator connected to inlet port 20. The float 26 has a reduced body portion 32 terminating in a neck 34 that loosely surrounds the upper end of the sleeve 40 forming the outlet port 22. The neck 34 has notches 36, for a purpose to be described later. The upper end of the float 26 is closed by a cap 38.

The elongated sleeve 40 has a tubular opening or passageway 42 and is threaded on its outside diameter for threading into an internally threaded opening in the cover or end cap 18. A valve stem 44 loosely extends through the passageway 42 and has a diameter slightly less than the diameter of the passageway to define an annular fluid-flow passageway leading into the chamber 14.

The upper end of the valve stem 44 is loosely connected to the float 26 through a relatively movable connection. In the illustrated embodiment, the connection consists of a transverse pin 46 that extends across the reduced neck 34 and through an enlarged opening 48 in the upper end of the valve stem 44 so that the float can move radially, as well as axially relative to the valve stem 44. This guards against sticking and assures operability of the valve.

The lower end of the sleeve 40 has a fixed valve seat 50 formed concentric with the passageway 42 at the exterior end. The valve stem 44 has an enlarged end 49 against which a removable valve element, such as as O-ring 52, is abutted.

In the use of the flow and floating check valve of the present invention, the valve is preferably designed to be installed in the vertical position, as illustrated in FIG. 1. A first fluid source, such as an ozone generator, is connected to port 20, while port 22 is connected to a second fluid source, such as a pump return line to a hot tub or swimming pool. In some circumstances, a venturi effect will cause a negative pressure to exist at the return to pull the ozonated air into the line. In some instances, a pump on the ozone generator will force the ozonated air into the line or directly into the tub or pool. While the ozone generator is operating, the ozonated air flows through inlet port 20 at the upper end of the chamber 14, along the annular space 30 around the float 26 through notches 36, into the annular space between the valve sleeve 40 and the valve stem 44, out the fixed valve seat 50 and into the pool or hot tub. In the event that there is a sudden increase in pressure at the pool or hot tub which results in liquid reaching the port 22, it will cause the valve to shut off in the following sequence which occurs virtually instantaneously. The liquid flows past the lower end of the valve stem and into the open end of the float. As the level of the liquid rises in the chamber, the air trapped in the closed end of the float causes the float to rise, in turn raising the valve stem along to seat the movable valve element 52 into contact with the fixed valve seat 50. In the event that the liquid is insufficient in quantities to raise the valve stem and float, there is no danger that the liquid will reach the ozone generator. At any time that the level of liquid is sufficient to partially fill the chamber, it will be sufficient to raise the float 26 and move the valve element 52 into sealing engagement with the valve seat 50.

During periods when the ozone generator is not operating, the inner chamber of the valve 10 is at atmospheric pressure or slightly less. Should liquid enter through the outlet port 22, it will cause the float 26 to rise, seating the movable valve element 52 on the fixed valve seat 50. Any increase in liquid pressure causes the closing force to increase. The air trapped in the float 26 acts to assure that the valve 52 will ultimately cut off all liquid to prevent it from reaching the ozone source.

It should be noted that when the liquid flow through the port 22 is at high pressure, the valve stem 44 will act as a piston closing rapidly to effectively provide a seal between the valve seat and the valve stem. The valve is also most effective at low flow rate and low pressure. Under these circumstances, even a small trickle of liquid flow, which would ordinarily not have sufficient pressure to act on the valve stem 44 to effect its closing, will slowly accumulate in the bottom of inner chamber 14 and will quickly seal off the spaced provided by the small notches. After the notches 36 are sealed, all the air in the float or cylinder 26 will be trapped and any additional liquid entering the chamber will cause the float 26 to raise, sealing the annular passage 42. Any leakage of liquid past the valve seat will only increase the sealing force on valve stem 44 between the va,ve seat 50 and valve element.

If there is a negative pressure in inner chamber 14, any liquid entering the chamber 14 will lift the float 26 moving the stem 44 and valve element 52 against the valve seat 50. This will occur before any appreciable amount of liquid accumulate in the lower end of inner chamber 14. In any event, any liquid flow through port 22 will ultimately fill the small space between the neck 32 of float 26 and the lower end of the chamber 14, if the valve does not close immediately, and the float will be immediately raised by any increase in the liquid level in chamber 14.

While this phenomenon is not completely understood, it is believed that the neck 34 and the reduced portion 32 cooperate to insure that the valve will seal before any appreciable amount of liquid flows into the chamber 14.

A modified form of valve stem is illustrated in FIG. 4, which is ozone corrosion resistant and provides for increased flow through the outlet port. In this embodiment, a center passage 60 is provided in valve stem 44a and a radial opening 62 extends to the surface above the valve element.

All of the components are preferably formed from polyvinyl chloride (PVC) which has great resistance to ozone corrosion, and the valve element or O-ring is preferably formed from a plastic material which is resistant to ozone corrosion.

While the invention has been generally in the environment of ozone treatment of liquids, the invention has obvious other applications. For example, the check valve arrangement could be used to control the liquid level in a holding tank or liquid levels in other environments.

I claim:

1. A flow and floating check valve assembly for use in a system to provide for the flow of a first fluid to a second fluid and to automatically interrupt the backflow of said second fluid through said assembly, said check valve assembly comprising an elongated hollow valve body defining an inner chamber, a first fluid inlet port at one end and a first fluid outlet at the opposite end, a float in said inner chamber, a hollow sleeve in said outlet port defining an elongated passageway to said inner chamber and having an exterior valve seat surrounding said passageway, a stem connected for relative movement to said float and extending through said passageway, said stem being dimensioned to provide an annular passage for fluid flow, a valve element on the outer end of said stem so that flow of said second fluid under pressure toward said outlet port will cause said valve stem to raise and seat said valve element on said valve seat by the pressure on the outer end of said stem or flow of the second fluid through said annular passageway into said inner chamber will raise said float and lift said stem to seat said valve element on said valve seat, said float including an elongated cylindrical member closed at its upper end and having a reduced portion at its lower end defining a reduced neck surrounding said outlet and having notches on the end of said neck to provide fluid communication to said inner chamber.

2. A flow and floating check valve assembly as defined in claim 1, in which said stem has a center opening for accomodating fluid flow through said outlet.

3. A flow and floating check valve as defined in claim 1, in which the connection between said float and said stem includes a pin extending across said reduced neck with said pin extending into said neck and having an enlarged opening receiving said pin to accomodate radial and axial movement of said float with respect to said stem.

4. A flow and float check valve comprising an elongated housing having an interior chamber and a float movable therein, said float cooperating with said chamber to allow fluid flow through said chamber, means defining an inlet opening at one end and an outlet opening at an opposite end with an exterior valve seat surrounding said outlet opening, a valve stem connected to said float and extending through said outlet opening, said valve stem being dimensioned to define an annular space between said outlet opening and said valve stem, and a valve element on an exterior end of said valve stem, said interior chamber being cylindrical and said float including a cylindrical member closed adjacent said inlet end and having a diameter less than said interior chamber to define an annular fluid flow passage, said cylindrical member having a reduced portion adjacent said outer end and surrounding said sleeve, a pin extending across said reduced portion with said valve stem having an enlarged opening receiving said pin to accommodate relative movement between said valve stem and said float.

5. A flow and float check valve as defined in claim 4, in which said outlet opening includes a hollow sleeve having a center passageway with said stem extending through said passageway and in which said valve seat is on the exterior end of said passageway.

6. A flow and float check valve as defined in claim 4, in which said valve stem has a fluid flow passage therethrough.

* * * * *